US009557515B2

(12) United States Patent
Brinks et al.

(10) Patent No.: US 9,557,515 B2
(45) Date of Patent: Jan. 31, 2017

(54) CAMERA MODULE AND METHOD FOR MANUFACTURING A CAMERA MODULE

(71) Applicant: ROBERT BOSCH GMBH, Stuttgart (DE)

(72) Inventors: Gerald Brinks, Waltenhofen (DE); Uwe Apel, Neckartailfingen (DE); Ulrich Seger, Leonberg-Warmbronn (DE)

(73) Assignee: Robert Bosch GmbH, Stuttgart (DE)

( * ) Notice: Subject to any disclaimer, the term of this patent is extended or adjusted under 35 U.S.C. 154(b) by 46 days.

(21) Appl. No.: 14/395,186

(22) PCT Filed: Apr. 11, 2013

(86) PCT No.: PCT/EP2013/057565
§ 371 (c)(1),
(2) Date: Oct. 17, 2014

(87) PCT Pub. No.: WO2013/156380
PCT Pub. Date: Oct. 24, 2013

(65) Prior Publication Data
US 2015/0092105 A1    Apr. 2, 2015

(30) Foreign Application Priority Data
Apr. 17, 2012   (DE) .................... 10 2012 206 252

(51) Int. Cl.
*G02B 7/02*    (2006.01)
*G03B 17/12*   (2006.01)
(Continued)

(52) U.S. Cl.
CPC ............... *G02B 7/022* (2013.01); *G02B 7/023* (2013.01); *G03B 17/12* (2013.01); *H04N 5/2257* (2013.01); *G02B 13/001* (2013.01); *Y10T 29/4987* (2015.01)

(58) Field of Classification Search
CPC ......... G02B 7/022; G02B 7/023; G02B 7/026; H04N 5/2257
(Continued)

(56) References Cited

U.S. PATENT DOCUMENTS 5,493,452 A * 2/1996 Hoshino ................ G02B 7/025
359/811
6,122,115 A    9/2000 Plummer et al.
(Continued)

FOREIGN PATENT DOCUMENTS

DE    102006000641    7/2007
DE    102007029475    1/2009
(Continued)

OTHER PUBLICATIONS

International Search Report for PCT/EP2013/057565, issued on Jul. 19, 2013.

*Primary Examiner* — Nhan T Tran
(74) *Attorney, Agent, or Firm* — Norton Rose Fulbright US LLP; Gerard Messina

(57) ABSTRACT

A camera module, in particular, for a vehicle, the camera module including at least: an objective mount and an objective, which is held in the objective mount and has a lens holder and at least one lens secured in the lens holder, the objective being fixed in position in the objective mount by a frictional connection between an outer surface of the lens holder and an inner surface of the objective mount. A plurality of frictional connection devices spaced apart in the circumferential direction are formed on the outer surface of the lens holder and/or on the inner surface of the objective mount, in order to generate the frictional connection. To insert and to adjust the objective, the objective mount is preferably asymmetrically deformed in an elastic manner,
(Continued)

and the objective is placed into the deformed objective mount, and the elastic deformation is subsequently removed.

22 Claims, 4 Drawing Sheets

(51) Int. Cl.
*H04N 5/225* (2006.01)
*G02B 13/00* (2006.01)

(58) Field of Classification Search
USPC .......................................... 348/373, 374, 335
See application file for complete search history.

(56) References Cited

U.S. PATENT DOCUMENTS

| | | |
|---|---|---|
| 2004/0036986 A1 | 2/2004 | Wisecarver et al. |
| 2005/0207034 A1 | 9/2005 | Kimura |
| 2006/0109668 A1* | 5/2006 | Schmieder ............. G02B 7/022 362/455 |
| 2008/0100932 A1* | 5/2008 | Noda ..................... G02B 7/022 359/819 |
| 2010/0103540 A1* | 4/2010 | An ......................... G02B 7/021 359/819 |
| 2011/0075021 A1* | 3/2011 | Chang .................. H04N 5/2257 348/374 |

FOREIGN PATENT DOCUMENTS

| | | | |
|---|---|---|---|
| EP | 1736810 | 12/2006 | |
| JP | 2004333615 | 11/2004 | |
| JP | 2004333615 A * | 11/2004 | ............. H04N 5/225 |
| JP | 2012022122 | 2/2012 | |

\* cited by examiner

CAMERA MODULE AND METHOD FOR MANUFACTURING A CAMERA MODULE

BACKGROUND INFORMATION

Camera modules for use in vehicles generally include an objective mount (lens holder), an image sensor (imager chip), and an objective held in the objective mount. The optical axis of the camera module is determined by the image sensor and the objective. The objective mount includes a generally cylindrical or tubular wall region, into which the objective is placed; the objective generally includes a lens holder and one or more lenses held by the lens holder. The objective mount may be used as a circuit substrate, so that the image sensor may be mounted directly to the objective mount; as an alternative to this, the objective mount may also be attached to a circuit substrate, on which the image sensor is mounted.

In the assembly of such camera modules, the reliable and rapid mounting of the objective in the objective mount is important for a high throughput and a high yield, that is, low defect rates. In this connection, it is advantageous when the positioning of the objective, which is ascertained via a sharpness test, may ultimately be set directly in the adjusting device without, for example, displacement being able to occur during the curing process of an adhesive.

To this end, it is known that in general, the objective may be introduced into the objective mount in a linear motion. This may be accomplished, first of all, using a screw thread; however, alignment with the aid of such a thread may normally not be carried out in a highly precise manner, since the thread must always be designed to have play, in order to prevent seizing or blocking of the thread during focusing. On the other hand, the play may result in displacement of the objective during a subsequent machining step, and may therefore cause a loss of sharpness. In addition, screwing operations are more time-consuming than purely linear motions.

However, when the objective is moved linearly into the objective mount, abrasion between the objective mount and the lens holder may occur, which may result in a build-up of particles on the image sensor and may therefore markedly reduce the quality of the image.

German Published Patent Application No. 10 2006 000 641 A1 describes the securing of an objective in an objective mount, in which the clamping ring is placed externally around the objective mount and is biased by reducing its diameter. However, instances of such large biasing may permanently deform the objective mount, for example, and therefore cause defocusing. In addition, shavings, which fall onto the image sensor and consequently affect the image quality, may also be formed while inserting the objective into the objective mount.

German Published Patent Application No. 10 2007 029 475 A1 describes the holding of a lens in the lens holder via a positive fit between the lens surface and the inner surface of the lens holder; the positive fit may be achieved by a groove on one of the components and a projection or lip on the other component.

SUMMARY

According to the present invention, a frictional connection between the lens holder and the objective mount is formed by a plurality of frictional connection devices, which are provided at the outer surface of the lens holder and/or the inner surface of the objective mount, so as to be set apart from one another in the circumferential direction.

The plurality of frictional connection devices runs, in particular, axially parallel to the optical axis. According to a particularly advantageous embodiment, three such frictional connection devices, e.g., protruding ribs or grooves, are uniformly spaced apart from one another in the circumferential direction, that is, by 120°.

The frictional connection devices may be formed, in particular, in one piece with the outer surface of the lens holder and/or the inner surface of the objective mount, that is, as parts or regions of the surface in question; however, in principle, it is also possible to attach additional frictional connection devices.

According to the present invention, the objective mount is elastically deformable, in order to allow the objective to be inserted without abrasion and, advantageously, even without contact or substantial contact. In this connection, in particular, an elastic, asymmetric deformation of the objective mount, which produces, in the region of the frictional connection devices, an increase in the distance of the frictional connection devices from the optical axis or an increase in a distance to the optical axis determined by the frictional connection devices, is advantageous.

Thus, unlike in, e.g., German Published Patent Application No. 10 2006 000 641 A1, the objective mount and the lens holder are advantageously designed in such a manner, that a gap or several gaps remain between them in some regions, but contact is made in the region of the frictional contact devices; in their undeformed state, the frictional connection devices initially protrude even somewhat further in an advantageous manner. When the frictional connection devices are formed on the inner surface of the objective mount, the frictional connection devices preferably protrude radially inwards to such an extent, that their distance from the optical axis is, in each instance, less than the outer radius of the lens holder.

The distance of the frictional connection devices to the optical axis is increased by asymmetric deformation, the gap being somewhat reduced in other regions in a corresponding manner; therefore, the annular objective mount, that is, its cylindrical wall region, is asymmetrically distorted in such a manner, that no contact or relevant contact with the outer surface of the lens holder is made at either the ribs or the regions situated between them, when the lens holder is subsequently inserted. This temporary deformation may be generated, in particular, by clamping devices, which are applied on the outside and are advantageously positioned centrally between the frictional connection devices, in order to reduce, here, the distance of the inner surface to the optical axis and to correspondingly increase this distance at the frictional connection devices.

The focusing may take place while the objective holder is deformed, in particular, by analyzing the video signals of the image sensor, as well; when the stress is subsequently decreased, the frictional connection devices produce self-centering, uniform holding without changing the axis of symmetry of the wall region of the objective holder, which means that its axis of symmetry continues to correspond to the optical axis of the lens.

After the adjustment, by reducing the radial bias or the action of the external forces on the objective mount, a frictional connection, in which the frictional connection devices or ribs are possibly somewhat deformed, may be produced without a sliding motion along the optical axis, and therefore, without abrasion.

Consequently, several advantages are achieved by the present invention:

During the adjustment, abrasion, in particular, between the lens holder and the objective mount, may be kept very small or completely prevented; during the operation of insertion in the longitudinal direction, no sliding motion with abrasion occurs; deformation of the frictional connection devices only occurs during the radial unloading, after the adjustment, but without abrasion from surfaces sliding on one another. Consequently, high performance of the camera module may be achieved.

Unlike in, e.g., German Published Patent Application No. 10 2006 000 641 A1, pressure is advantageously not applied over a large surface, but only in some frictional connection devices spaced apart in the circumferential direction. By this means, biasing over a large surface and deformation, e.g., of the objective mount or also the lens holder, as well as possible defocusing, may be prevented. In addition, after completion, the strain is low to negligible and is chiefly limited to the frictional connection devices.

Symmetric distribution of the frictional connection devices in the circumferential direction, in particular, with three frictional connection devices, allows a highly advantageous, self-centering mount of the lens holder in the objective mount, while the friction surface is kept small. In the case of a few clamping devices, in particular, three clamping devices, a large deformation of, and therefore, change in the distance of the frictional connection devices from the optical axis, may also be obtained.

A rapid manufacturing method or method of positioning and adjusting the objective is possible, in particular, via external biasing by clamping devices, positioning and adjusting of the objective with evaluation of the recorded image, and releasing the bias of the clamping devices.

The use of further fixing devices, such as an outer clamping ring or bolts, adhesive, etc., may be eliminated; the outer clamping devices are part of the manufacturing fixture.

In particular, when the frictional connection devices are formed in one piece with the surface in question, higher manufacturing costs due to additional component parts and their attachment are not generated.

DETAILED DESCRIPTION

Figure 1:
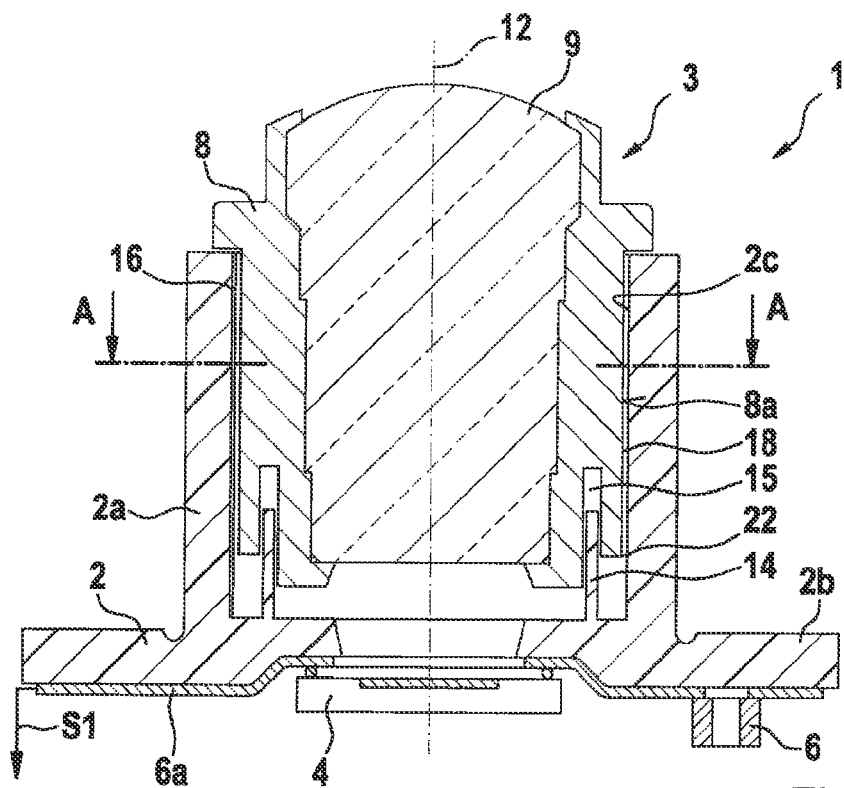
FIG. 1 shows a longitudinal section of a specific embodiment of a camera module along the axis of symmetry.
Figure 2:
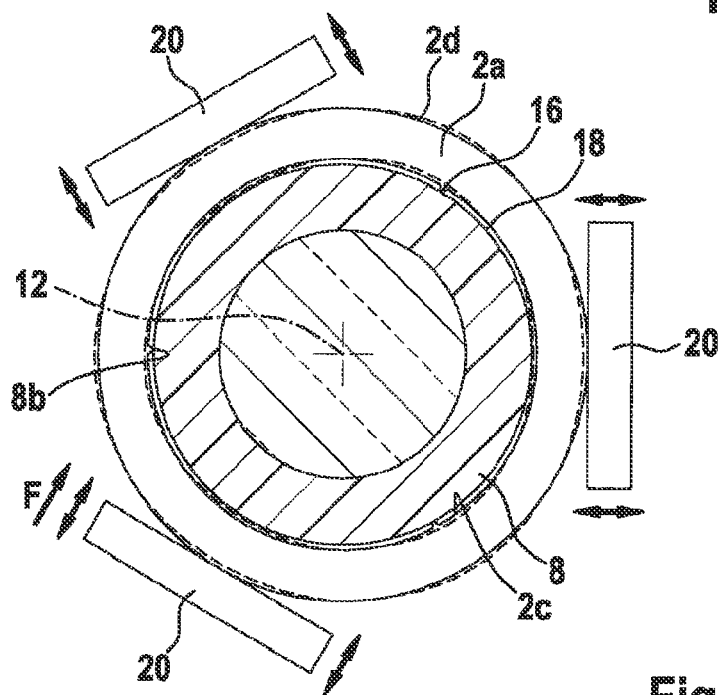
FIG. 2 shows a horizontal section along the line A-A from FIG. 1.
Figure 3:
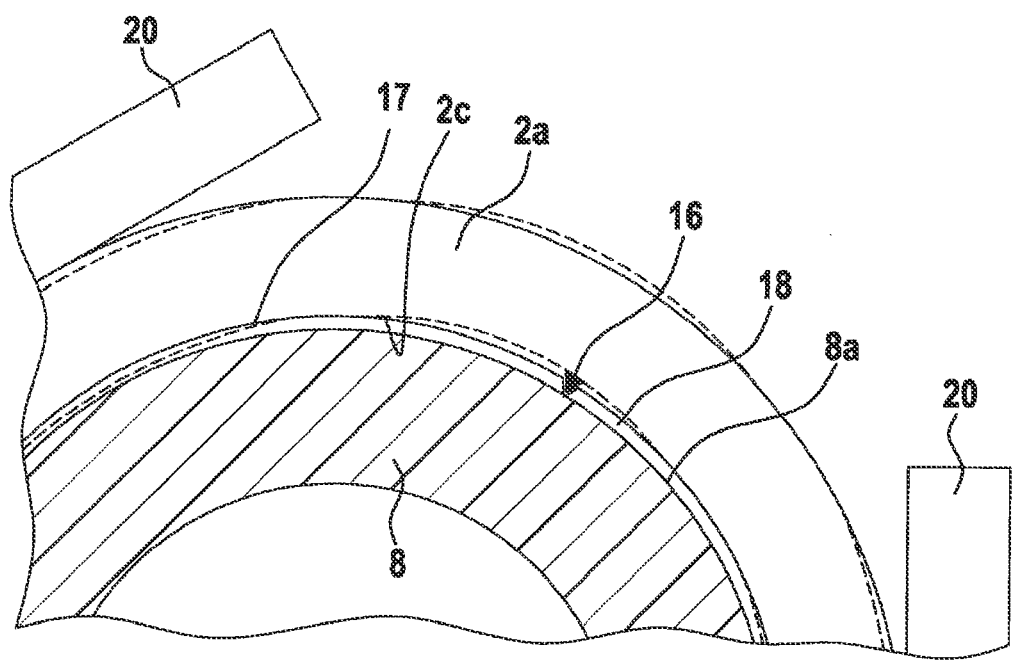
FIG. 3 shows a detail from FIG. 2.

A camera module 1 includes an objective mount 2, an objective 3 held in objective mount 2, and an image sensor mounted to objective mount 3.

Objective mount 2 is preferably made of a plastic material or molded material, e.g., one produced in a molding process or pressure diecasting process. It includes a cylindrical wall region (tube region) 2a and a contiguous mounting region 2b on the bottom in FIG. 1, which is used, e.g., for mounting to a support and also accommodates, in particular, image sensor 4. Mounting region 2b may be used directly as a circuit substrate for image sensor 4 and further components 6, in particular, passive components. To this end, e.g., electrical lines may be formed, e.g., as a patterned metallic layer 6a, in or on mounting region 2b in a manner known per se.

Objective 3 includes a lens holder 8 and one or more lenses 9 accommodated in lens holder 8; a simplified representation having one lens 9 is shown in the figures. Lens holder 8 may again be made of a plastic material, the at least one lens 9 being held in lens holder 8, e.g., in a form-locked manner, and/or glued and/or welded; in principle, lens holder 8 may also be extruded or formed around the at least one lens 9.

Thus, the entire camera module 1 defines an optical axis 12, which runs symmetrically through lens 9 and image sensor 4. Lens holder 8 and wall region 2a of objective mount 2 run concentrically to optical axis 12.

To form camera module 1, objective 3 is adjusted and fixed in position in objective mount 2; for the adjustment, e.g., a test pattern being acquired by camera module 1 and video signals S1 outputted by image sensor 4 being analyzed, as indicated in FIG. 1. Adjustment is effective when a sharp image of the test pattern is formed. Thus, the adjustment is carried out in the direction of optical axis 12 until a suitable position is found, after which outer lens holder 8 of objective 3 is fixed in position in wall region 2a of objective mount 2.

Positioning devices 14, 15, according to the specific embodiment shown, studs 14 projecting from mounting region 2b of the objective mount 2 in FIG. 1 and corresponding recesses 15 in lens holder 8, are provided on objective mount 2 and lens holder 8. Positioning devices 14, 15 are used for fixing the angular position, that is, the angular position with respect to optical axis 12, and used as guiding devices during the operation of insertion in the longitudinal direction or direction of optical axis 12.

Lens holder 8 is fixed in position at wall region 2a of objective mount 2, using an interference fit, that is, a frictional connection (force-locked connection) between an inner wall 2c of wall region 2a and a cylindrical outer surface (outer wall) 8a of lens holder 8. To this end, three ribs 16 are provided at inner surface 2c and/or outer surface 8a as frictional connection devices; ribs 16 are advantageously formed on inner surface 2c of objective mount 2 and project radially, i.e., towards axis of symmetry 12, that is, inwards. Intermediate regions 17 are formed on inner surface 2c of wall region 2a, between ribs 16; thus, three ribs 16 are uniformly spaced apart from one another in the circumferential direction, i.e., at an angle of 120°, and separated by corresponding intermediate regions 17.

Such a layout of ribs 16 may allow for (essentially) only these ribs (fins) 16 to be deformed, but not lens holder 8. This produces a mount, in which a frictional connection or stresses are generated only between ribs 16 and respective contact regions 8b of outer surface 8a of lens holder 8.

Figure 4:
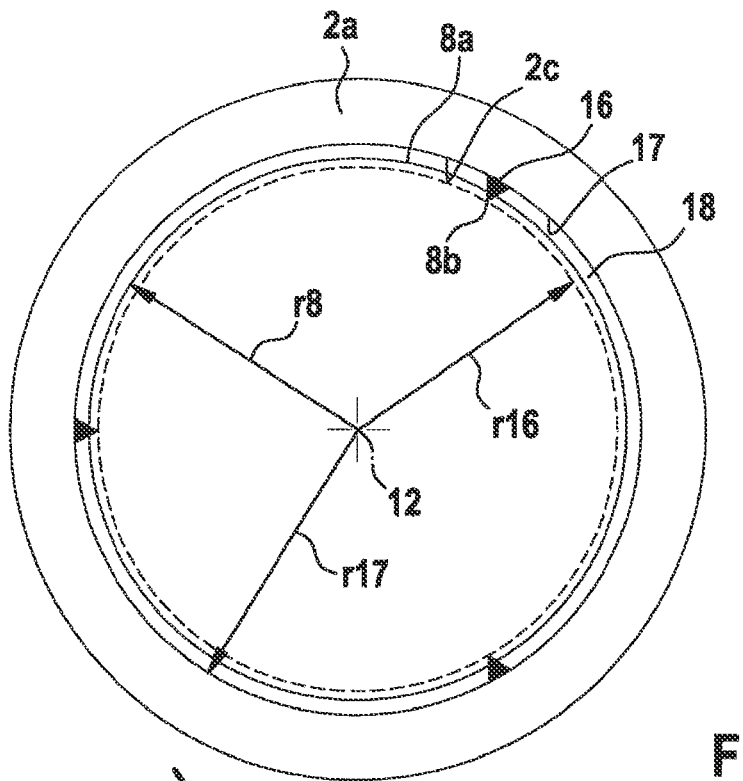
FIG. 4 shows a simplified representation of relevant radii of the lens holder and of the objective mount in the undeformed state.

FIG. 4 shows relevant distances and radii of the set-up prior to the biasing, i.e., also prior to inserting objective 3 into objective mount 2. In the initial state of wall region 2a, ribs 16 are, e.g., formed to be tapered inwards in the shape of a triangle or wedge; in the inserted state of FIG. 1, they are subsequently deformed. A radius r8 of cylindrical outer surface 8a of lens holder 8, that is, the outer radius of lens holder 8, is less than an inner radius r17 of intermediate regions 17, but greater than a distance r16 of ribs 16 to optical axis 12.

For mounting, three clamping jaws 20 are externally positioned against an outer surface 2d of wall region 2a and drawn in with a force F in the radial direction, that is, towards axis of symmetry 12. Clamping jaws 20 are, in turn, centrally offset from ribs (fins) 16, i.e., offset, in their position, from ribs 16 by 120°/2=60° and staggered with respect to each other by 120°. Therefore, the three clamping jaws 20 form a three jaw chuck, which is also known, as such, e.g., for holding, e.g., other tools. Clamping jaws 20 deform cylindrical wall region 2a asymmetrically, that is, in particular, as is apparent from FIG. 5, into a non-axially symmetric shape having essentially a slightly triangular shape. This deformation is elastic; after clamping jaws 20 are retracted, cylindrical wall region 2a assumes its initial shape again.

Figure 5:
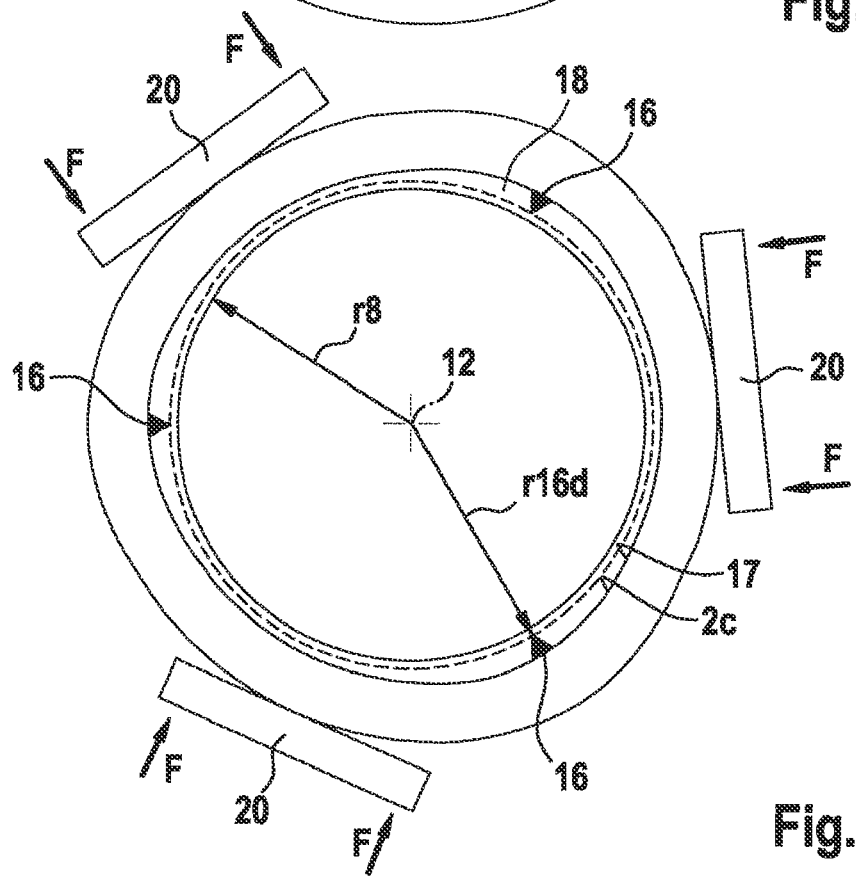
FIG. 5 shows a simplified representation of relevant radii in the deformed state of the objective mount.
Figure 6:
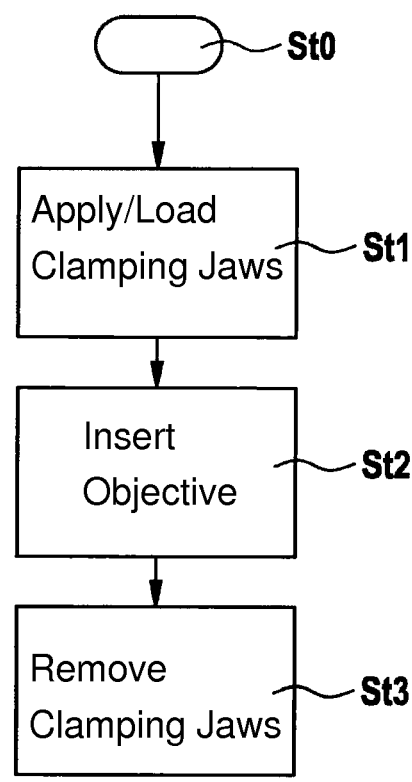
FIG. 6 shows a flow chart of the method according to the present invention.

Due to the elastic deformation, ribs 16 are pressed somewhat outwards radially; consequently, a gap 18 between inner surface 2c and outer surface 8a becomes asymmetric and is reduced in the region of clamping jaws 20 and increased 60° from it, that is, in the region of ribs 16. In this deformed position of FIG. 5, objective 3 may be subsequently inserted in the direction of optical axis 12 without any abrasion or significant contact between inner surface 2c and outer surface 8a; with suitable guidance, such contact may even be completely prevented. Consequently, abrasion of the plastic materials of inner surface 2c and outer surface 8a also does not occur. Thus, in the deformed state of FIG. 5, distance r16d of ribs 16 to optical axis 12 is increased and, as shown in FIG. 5, is greater than outer radius r8 of lens holder 8. Between ribs 16, the radius of inner surface 2c does decrease, but remains greater than r8.

While objective 2 is adjusted by longitudinally displacing it along optical axis 12, video signals S1 outputted by image sensor 4 are analyzed. The adjustment may further include rotation of objective 2 about optical axis 12, as well, in order to reach an effective angular optical position.

Upon reaching an effective adjustment position, the force F on clamping jaws 20 is reduced again, that is, clamping jaws 20 are moved outwards again, so that ribs 16 move inwards in the radial direction, against contact regions 8b of outer surface 8a, in which case ribs 16 correspondingly deform somewhat. Consequently, a bias or a force-locked connection or frictional connection is generated; in the case of this self-centering mount, the position of objective 8 in objective mount 2 is not changed; in particular, there is also no tilting about optical axis 12. In this connection, ribs 16 advantageously run in the longitudinal direction over a large area, e.g., uninterrupted; constructions discontinuous in the longitudinal direction or direction of optical axis 12 are also possible, which means that ribs 16 may be situated, e.g., in a region located further up and a region located further down.

After clamping jaws 20 are moved away, video signal S1 is advantageously analyzed again to determine if, contrary to expectations, deterioration of the video signal has occurred.

Outer surface 8a may be contoured, e.g., fluted, in particular, with grooves 22 indicated in FIG. 1, which run around in the circumferential direction, so that when brought into contact with these grooves 22 or flutes, ribs 16 correspondingly press themselves in, which means that in addition to the frictional connection, a form-locked connection is generated, which improves the stability of the focus position.

Thus, the method of the present invention starts at step St0. According to step St1, clamping jaws 20 are applied and loaded, so that the deformation of wall region 2a of objective mount 2 shown in FIG. 5 occurs; according to step St2, objective 3 is subsequently inserted into deformed objective mount 2 in the direction of optical axis 12, and an adjustment is made by displacing it in the longitudinal direction and, in some instances, rotating it, while simultaneously picking up video signals S1 until the optimum adjustment position is ascertained from video signals S1. In step St3, clamping jaws 20 are subsequently removed again to form camera module 1.

What is claimed is:

1. A camera module for a vehicle, comprising:
an objective mount;
an objective held in the objective mount and including a lens holder and at least one lens secured in the lens holder, wherein the objective is fixed in position in the objective mount by a frictional connection between an outer surface of the lens holder and an inner surface of the objective mount, and wherein the objective mount is elastically deformable; and
a plurality of frictional connection devices spaced apart in a circumferential direction and formed at least one of on the outer surface of the lens holder and on the inner surface of the objective mount, in order to form the frictional connection,
wherein the outer surface of the lens holder and the inner surface of the objective mount are only in contact with one another via the frictional connection devices, and wherein contact-free intermediate regions are formed at least one of on the outer surface of the lens holder and on the inner surface of the objective mount, between the frictional connection devices.

2. The camera module as recited in claim 1, wherein the camera module is for a vehicle.

3. The camera module as recited in claim 1, wherein the plurality of frictional connection devices run parallel to a longitudinal axis of the objective mount.

4. The camera module as recited in claim 1, wherein exactly three frictional connection devices spaced apart in the circumferential direction are provided.

5. The camera module as recited in claim 1, wherein the frictional connection devices are uniformly spaced apart in the circumferential direction.

6. The camera module as recited in claim 1, wherein the frictional connection devices are at least one of formed in one piece with the outer surface of the lens holder and formed in one piece with the inner surface of the objective mount.

7. The camera module as recited in claim 1, wherein the frictional connection devices are deformable ribs that are situated on the inner surface of the objective mount, and wherein the frictional connection devices project radially inwards.

8. The camera module as recited in claim 1, wherein:
the outer surface of the lens holder and the inner surface of the objective mount are cylindrical and positioned concentrically to one another, and
in response to an asymmetric action of forces from the outside radially inwards towards one of an axis of symmetry and an optical axis, a cylindrical wall region of the objective mount, at which the inner surface is formed, is asymmetrically deformable.

9. The camera module as recited in claim 8, wherein:
in response to an asymmetric action of force from the outside, the wall region of the objective mount is deformable in such a manner, that in an undeformed state, at least one of an inner radius defined by the frictional connection devices and a distance of the frictional connection devices to one of the optical axis and the axis of symmetry is less than an outer radius of the lens holder, and that in a deformed state, at least one of the inner radius defined by the frictional connection devices and the distance of the frictional connection devices to one of the optical axis and the axis of symmetry is greater than an outer radius of the lens holder.

10. The camera module as recited in claim 1, wherein the outer surface of the lens holder has surface contouring running around in the circumferential direction, in order to improve the frictional connection to the frictional connection devices of the objective mount.

11. The camera module as recited in claim 10, wherein the surface contouring includes grooves.

12. The camera module as recited in claim 1, further comprising:
an image sensor for picking up and outputting a video signal, the image sensor being mounted one of to the objective mount taking the form of a circuit substrate and to a circuit substrate rigidly connected to the objective mount.

13. The camera module as recited in claim 1, further comprising:
first positioning devices situated on the objective mount; and
second positioning devices situated on the lens holder for mutual engagement and for guidance while positioning the objective in the objective mount, and for fixing an angular position between the objective mount and the objective.

14. The camera module as recited in claim 1, wherein the objective mount is elastically deformable from an initial undeformed axially-symmetric cylindrical shape to a deformed non-axially-symmetric shape.

15. A method for manufacturing a camera module, comprising:
forming a plurality of frictional connection devices spaced apart in a circumferential direction at a uniform angular offset at least one of on an outer surface of a lens holder and on an inner surface of an objective mount;
inserting an objective, which includes the lens holder and at least one lens secured in the lens holder, into the objective mount, positioned, and adjusted while a frictional connection is formed;
prior to the inserting of the objective, applying an external, asymmetric action of forces to the objective mount, thereby elastically deforming the objective mount;
subsequently inserting the objective into the objective mount and adjusting the objective; and
without changing a position of the objective in the objective mount, terminating the external action of forces with elastic recovery of the objective mount to form a frictional connection between an inner surface of the objective mount and an outer surface of the objective, wherein the outer surface of the lens holder and the inner surface of the objective mount are only in contact with one another via the plurality of frictional connection devices, and wherein contact-free intermediate regions are formed at least one of on the outer surface of the lens holder and on the inner surface of the objective mount, between the plurality of frictional connection devices.

16. The method as recited in claim 15, further comprising:
in order to generate the asymmetric action of forces, externally applying a plurality of clamping devices distributed in a circumferential direction to the objective mount, wherein a number of clamping devices corresponds to a number of the frictional connection devices; and
displacing the clamping devices radially inwards towards an optical axis under the action of forces.

17. The method as recited in claim 16, further comprising:
applying the clamping devices over a circumference of the objective mount in a distributed manner with the uniform angular offset; and
offsetting the clamping devices from the frictional connection devices.

18. The method as recited in claim 17, wherein the clamping devices are offset by half of the uniform angular offset.

19. The method as recited in claim 17, wherein the plurality of frictional connection devices includes three frictional connection devices.

20. The method as recited in claim 17, further comprising:
forming the frictional connection devices running parallel to the optical axis on the inner surface of the objective mount, the clamping devices being acted upon by a force in such a manner that in a deformed state, a distance of the frictional connection devices to one of the optical axis and an axis of symmetry of the objective mount is greater than, and in an undeformed state, less than, an outer radius of the lens holder; and
slipping the objective into the objective mount deformed by the clamping devices, without at least one of contact and frictional resistance of the outer surface of the lens holder at least one of with and at the inner surface of the objective mount.

21. The method as recited in claim 20, wherein the frictional connection devices include ribs.

22. The method as recited in claim 15, wherein applying an external, asymmetric action of forces to the objective mount elastically deforms the objective mount from an initial undeformed axially-symmetric cylindrical shape to a deformed non-axially-symmetric shape.

* * * * *